United States Patent
Apostolopoulos et al.

(10) Patent No.: US 8,200,747 B2
(45) Date of Patent: Jun. 12, 2012

(54) SESSION HANDOFF OF SEGMENTED MEDIA DATA

(75) Inventors: John G. Apostolopoulos, San Carlos, CA (US); Sumit Roy, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2229 days.

(21) Appl. No.: 10/195,081

(22) Filed: Jul. 12, 2002

(65) Prior Publication Data

US 2004/0010593 A1    Jan. 15, 2004

(51) Int. Cl.
  *G06F 15/16*    (2006.01)
(52) U.S. Cl. .................... 709/203; 709/231; 709/232
(58) Field of Classification Search .................. 709/203, 709/231, 232
  See application file for complete search history.

(56) References Cited

U.S. PATENT DOCUMENTS

| | | | | |
|---|---|---|---|---|
| 5,586,264 A * | 12/1996 | Belknap et al. | ............... | 725/115 |
| 5,845,279 A * | 12/1998 | Garofalakis et al. | ............... | 707/7 |
| 6,275,703 B1 * | 8/2001 | Kalev | ............... | 455/436 |
| 6,463,508 B1 * | 10/2002 | Wolf et al. | ............... | 711/133 |
| 6,504,828 B1 * | 1/2003 | Corbett | ............... | 370/331 |
| 6,842,824 B2 * | 1/2005 | Yamauchi et al. | ............... | 711/133 |
| 7,028,096 B1 * | 4/2006 | Lee | ............... | 709/231 |
| 2001/0002798 A1 * | 6/2001 | Lien | ............... | 327/78 |
| 2001/0044315 A1 * | 11/2001 | Aoki et al. | ............... | 455/524 |
| 2002/0143852 A1 * | 10/2002 | Guo et al. | ............... | 709/201 |
| 2003/0204599 A1 * | 10/2003 | Trossen et al. | ............... | 709/227 |
| 2003/0212764 A1 * | 11/2003 | Trossen et al. | ............... | 709/219 |

OTHER PUBLICATIONS

Roger Karrer, "Dynamic Handoff of Multimedia Streams," Jun. 25, 2001, ACM 1-58113-370-7/01/0006, pp. 125-133.*

* cited by examiner

*Primary Examiner* — John Follansbee
*Assistant Examiner* — Nghi V Tran

(57) ABSTRACT

A method and system thereof for handing off a media session are described. In one embodiment, a first media segment is forwarded to a client node. The first media segment includes a portion of an item of media content stored in lieu of storing the item of media content in its entirety. The item of media content is segmented according to segmentation characteristics. Handoff information used for transferring the media session to another server node is specified. The handoff of the media session to the other server node occurs when the forwarding of the first media segment is completed, such that the handoff occurs between media segments.

20 Claims, 11 Drawing Sheets

SESSION HANDOFF OF SEGMENTED MEDIA DATA

TECHNICAL FIELD

Embodiments of the present invention relate to the field of streaming media data. More specifically, embodiments of the present invention relate to the handoff of a media session from one node to another node.

BACKGROUND ART

Before the widespread use of caching in the Internet, an item of content requested by a client was likely provided by the original content server (the source of the content). The content source and the client were typically located at a substantial distance from each other, which often led to slow response times, low bandwidths, high loss rates, and lack of scalability. Response times, bandwidths, and loss rates could also be significantly affected when multiple clients attempted to request an item from the content source at the same time.

Different forms of caching—such as content delivery networks—have helped to overcome these problems for the most part. Generally, content delivery networks place servers nearer to clients (e.g., at the edges of networks). Items of content are replicated and cached at each of the servers. Caching of replicated content on servers closer to clients has resulted in a number of improvements, including reduced response times, higher bandwidths, lower loss rates, improved scalability, and reduced requirements for network (backbone) resources.

Content delivery networks work well when the size of the content is relatively small in comparison to the size of the caches. For example, a Web page is generally much less than a megabyte in size. As such, this kind of content can be practically replicated at each server. Multiple instances of Web content can be stored on each server without the need for substantial memory resources, or without consuming a significant portion of available memory.

However, caching can be problematic when the content includes multimedia data, which can be large in size as well as long in duration. Even a large cache can hold only a few items of multimedia content before getting filled. For example, a video of DVD (digital video disk) quality may be up to 4.7 gigabytes (GB) in size and up to two hours long (based on Moving Picture Expert Group-2 compression). Consequently, a 50 GB cache can hold only about ten DVD-quality videos. Thus, replicating a large number of DVD-quality videos and storing copies at servers closer to clients is not a practical solution for multimedia data. Memories would need to be very large, or only a small number of videos could be stored. On the other hand, storing large items of multimedia content only at a central source or only at a limited number of servers reintroduces the problems mentioned above.

Accordingly, a method and/or system for delivering large items of media content without the attendant problems discussed above would be desirable. Another aspect of content delivery networks is the capability to handoff a media session from one server to another depending on factors such as server loads and client mobility and perhaps other considerations as well. It would also be desirable that a method and/or system for delivering large items of media content facilitate the handoff of media sessions involving multimedia content.

DISCLOSURE OF THE INVENTION

Embodiments of the present invention pertain to a method and system thereof for handing off a media session. In one embodiment, a first media segment is forwarded to a client node. The first media segment includes a portion of an item of media content stored in lieu of storing the item of media content in its entirety. The item of media content is segmented according to segmentation characteristics. Handoff information used for transferring the media session to another server node is specified. The handoff of the media session to the other server node occurs when the forwarding of the first media segment is completed, such that the handoff occurs between media segments.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
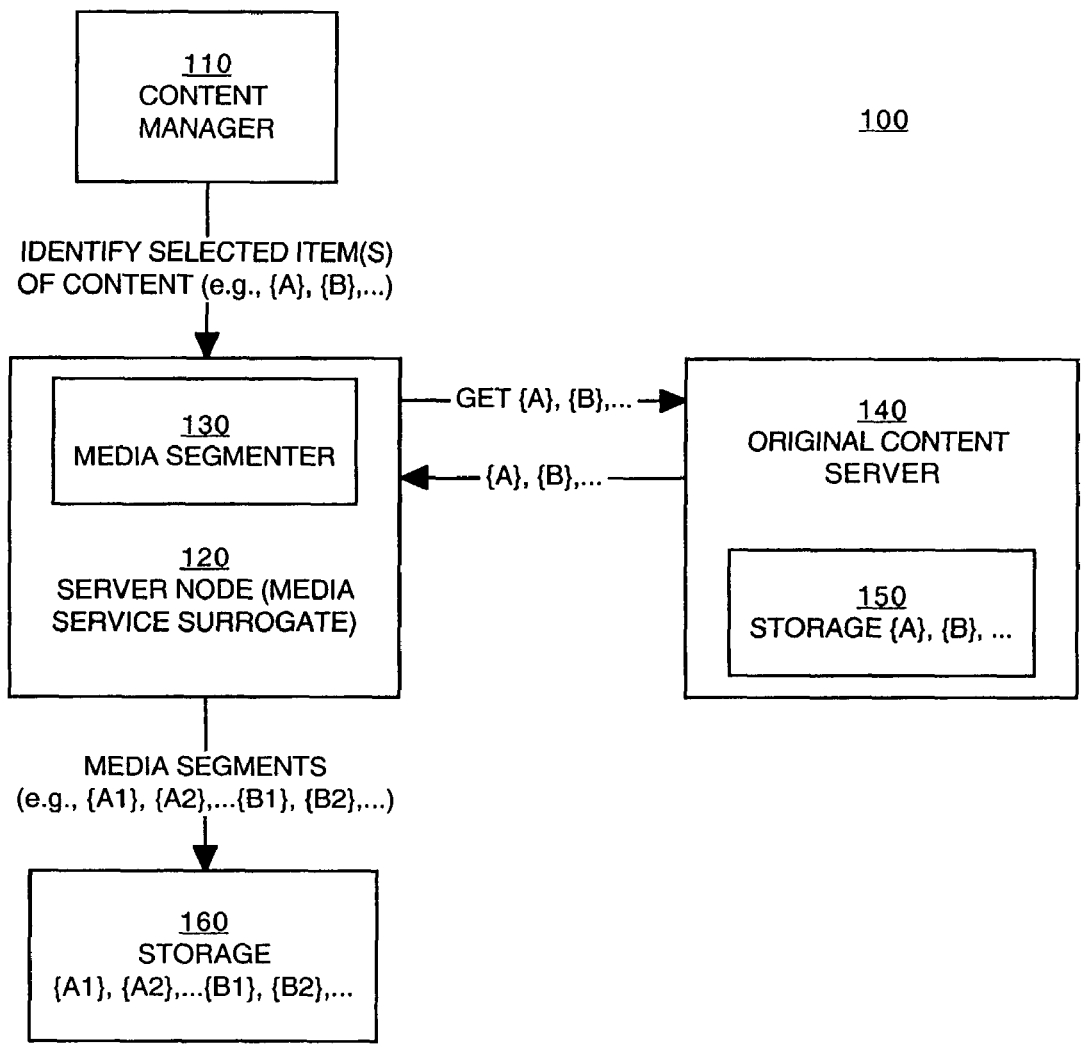
FIG. 1 is a block diagram of an exemplary architecture for segmenting items of media content according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are discussed in the context of multimedia data (also referred to herein as media data or media content). Multimedia data are exemplified by video data accompanied by audio data; for example, in common terms, a multimedia item of content may be a movie with soundtrack. In general, the present invention, in its various embodiments, is well-suited for use with audio-based data, image-based data, Web page-based data, graphic data and the like, and combinations thereof. Also, the present invention, in its various embodiments, is well-suited for use with data that may or may not be encoded (compressed), encrypted or transcoded.

In overview, embodiments of the present invention provide a method and system that more efficiently utilize available cache resources in a manner transparent to requesting clients. In one embodiment, each item of media content (a DVD-quality video, for example) is segmented into a number of media segments according to segmentation characteristics described more fully below. In one such embodiment, those media segments that are most likely to be requested by clients accessing a particular server are stored (cached) at that server. Thus, instead of storing an item of media content in its entirety at a server, only one or more portions of that item may be stored. Consequently, many items of content can be representatively stored at each server.

For example, in one of the simplest cases, the first portions of each of a large number of items of content can be stored at each server. Alternatively, different portions of different items of content can be stored at each server, where the stored portions are selected based on, for example, their popularity and whether storing them will improve performance and/or reduce costs. Then, while one portion of an item of media content is being forwarded (streamed or otherwise sent) to a requesting client, other portions of that item can be retrieved in the background. Therefore, the item of media content can be forwarded to the client without apparent disruption and hence without the client being aware of whether the entire item is stored on the server, or only a portion is stored.

Also, in another embodiment, the client can be handed off from one server to another depending on factors such as the storage location of particular media segments or the mobility of the client. Media segmentation facilitates this process because handoffs between streaming servers can be timed to occur between media segments.

Storage and Distribution of Segmented Media Data

FIG. 1 is a block diagram of an exemplary architecture 100 for segmenting items of media content according to one embodiment of the present invention. Only a portion of architecture 100 is shown in FIG. 1. As will be seen by the discussion pertaining to the other figures below, architecture 100 can include additional elements. These elements may be used to store and distribute media data as well as encrypt/decrypt, compress/decompress (encode/decode), and/or transcode that data. Also, in the following discussion, the elements of architecture 100 will be described according to the functions they each perform. It is appreciated that functions described as being performed by multiple elements may instead be performed by a single element. Similarly, it is appreciated that multiple functions described as being performed by a single (multifunctional) element may instead be divided in some way amongst a number of individual elements.

Continuing with reference to FIG. 1, in the present embodiment, architecture 100 includes content manager 110 in communication with a server node 120. Server node 120 may also be known as a media service surrogate. Server node 120 includes media segmenter 130. Server node 120 may have the functionality to encrypt/decrypt, compress/decompress, and/or transcode data. Server node 120 is communicatively coupled to storage 160 and original content server 140. Original content server 140 includes storage 150. Original content server 140 may also have the functionality to encrypt/decrypt, compress/decompress, and/or transcode data. As mentioned above, the elements of architecture 100 may be combined. For example, storage 160 may be incorporated into server node 120, media segmenter 130 may reside on original content server 140, and the like.

In the present embodiment, each of the elements of architecture 100 communicate over a wired or wireless network, or over a hybrid network that includes both wired and wireless portions. Although content manager 110 is shown as communicating with server node 120, it may also communicate directly with original content server 140. Furthermore, content manager 110 is in communication with other server nodes (refer to FIGS. 3A and 3B, for example).

In one embodiment, architecture 100 of FIG. 1 is used as follows. Content manager 110 directs media segmenter 130 to segment a particular item of content or a number of such items. For simplicity, only two items of content, referred to as A and B, are discussed; however, it is appreciated that features of the present invention, in each of its embodiments, may be utilized with any number of items of content. Items of content may include items such as movies or live events that have been captured and recorded, or live events that are to be distributed in real time.

In addition, items of content may be differentiated from each other in many different ways. For example, content A may be one movie (one title) and content B another movie (a different title). Alternatively, contents A and B may each be the same movie (same title), but with different characteristics according to the different attributes of downstream (client) devices. Client devices may have different display, power, computational, and communication characteristics and capabilities. Thus, for example, content A may be a movie formatted (e.g., transcoded) for one type of receiving (client) device, and content B may the same movie formatted for another type of client device.

For each item of content, content manager 110 provides information identifying the item (e.g., the item's name) and its location (a Uniform Resource Locator, for example). Also, content manager 110 provides information about how the segmentation is to be performed. For example, content manager 110 may specify the number of segments, the size of each segment, and/or the duration (in time) of each segment.

In the present embodiment, in response to the direction provided by content manager 110, media segmenter 130 requests the specified items of content from original content server 140. Original content server 140 retrieves the requested items of content from storage 150 and sends them to media segmenter 130 (that is, to server node 120). Note that, as mentioned above, content manager 110 could instead communicate directly to original content server 140, and as such could direct original content server 140 to send particular items of content to media segmenter 130. Also, note that media segmenter 130 may request/receive the entire item of content or some portion thereof. Furthermore, in the case of real-time content delivery (of a live event, for example), media segmenter 130 may directly receive the real-time video feed.

In the present embodiment, media segmenter 130 segments the item(s) of content. For simplicity of discussion and illustration, the segmented data for item of content A are represented as media segments {A1}, {A2}, etc., and the segmented data for item of content B are represented as media segments {B1}, {B2}, etc.

As mentioned above, content A may be one item of content and content B another item of content, or content A and content B may correspond to the same item of content but with different characteristics for use with different client devices having different attributes and capabilities. Consider an example in which content A is encoded at a first bit rate and content B is encoded at a second bit rate (this discussion is also applicable to other attributes such as spatial resolution, etc.). In that case, a switch can be made from one bit rate to another at the segment boundaries. That is, a requesting device may receive media segment A1 followed by media segment B2. This may be useful for time-varying channels or when there is a portion of content that a user would like to see with higher quality relative to another portion of content.

In one embodiment, the segmented data are stored in storage 160. Although a single storage 160 is shown, it is appreciated that there may be any number of such storage elements. Each of these storage elements may be populated with the same or with different segmented items of content.

In an alternate embodiment, the segmented data are sent directly to various server nodes (e.g., server nodes 210 and/or 230 of FIGS. 3A and 3B) in addition to or as an alternative to storing the segmented data in storage 160. For example, in the case of a real-time event that is known to be popular and so will likely be accessed by a large number of users in real time, segmented content can be directly distributed to server nodes that in turn forward the segmented data (media segments) to requesting client nodes.

In various embodiments, each item of media content is segmented into a number of segments in a fixed or in an adaptive manner. Generally, each item of media content is segmented in its entirety; that is, all portions of an item of media content are included in the media segments such that the assembled segments yield the entire item of media content. In fixed segmentation, the items of media content are segmented according to some standard set of segmentation rules. In adaptive segmentation, the number of segments and the length of each segment are determined by a number of factors including: the characteristics of the item of media content itself, the characteristics of the device(s) where the segments will be stored, and a predicted frequency of use of each item of content and each portion of each item of content (e.g., their popularity). As will be seen, information describing the frequency of use of items of content and media segments, the attributes of receiving devices (client nodes), and the attributes of storage devices can be accumulated and provided to content manager 110 of FIG. 1, for example. This information can be used by content manager 110, or some other centralized entity, to determine which items of content are to be segmented, how they are to be segmented, and where the media segments are to be stored. As the information is updated, content manager 110 can adapt its decisions according to the most recent information as well as historical trends.

As mentioned above, for adaptive segmentation, factors such as the characteristics of the item of media content itself, the characteristics of the device(s) where the segments will be stored, and a predicted frequency of use of each item of content and each portion of each item of content are considered. Considering the first of these factors, the boundaries of the media segments (e.g., the start and stop points of the segments) are chosen such that the resulting segmentation is "friendly to the media." For example, for compressed media data, the segmentation boundaries can be selected to coincide with units of media data that are independently decodable. Segmenting data in this manner can facilitate features such as distortion-free random access into a stream of media data. The independently decodable units of media may correspond to: Group-of-Pictures boundaries, the spacing between I-frames, frame boundaries, and/or independently decodable units within a frame (e.g., Groups-of-Blocks or slices or video packets), depending on the particular compression standard being used. As such, should delivery of the selected item of content be interrupted (e.g., the second segment is delivered but the third segment is late), the receiving (client) node will still have received a decodable unit. Thus, the client node will be able to display a picture (static or moving) without significant distortion or without crashing because each segment provides the necessary data for complete decoding of the content within that segment. Also, as will be seen, the choice of boundaries for media segmentation can facilitate midstream handoff of a media session between servers.

Intelligent selection of media segment boundaries is particularly well-suited for media data not designed or captured with segmentation in mind. For example, a live event will not necessarily be recorded in a manner that readily allows the media data to be divided into independently decodable units. In such cases, the segmentation boundaries are intelligently selected to nevertheless segment such media data into independently decodable units.

Figure 3A:
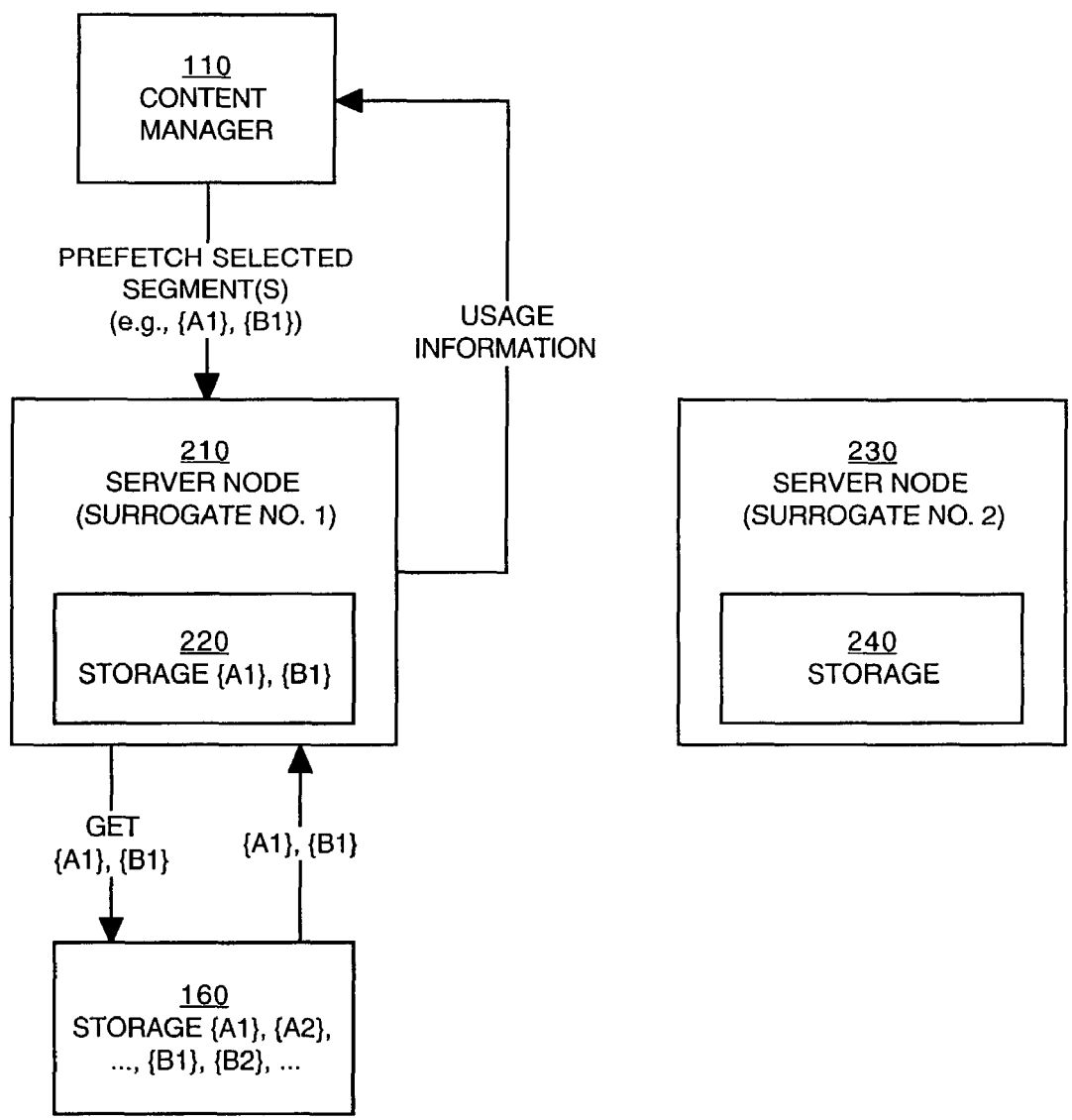
FIGS. 3A and 3B illustrate a data flow for populating caches with media segments according to one embodiment of the present invention.
Figure 3B:
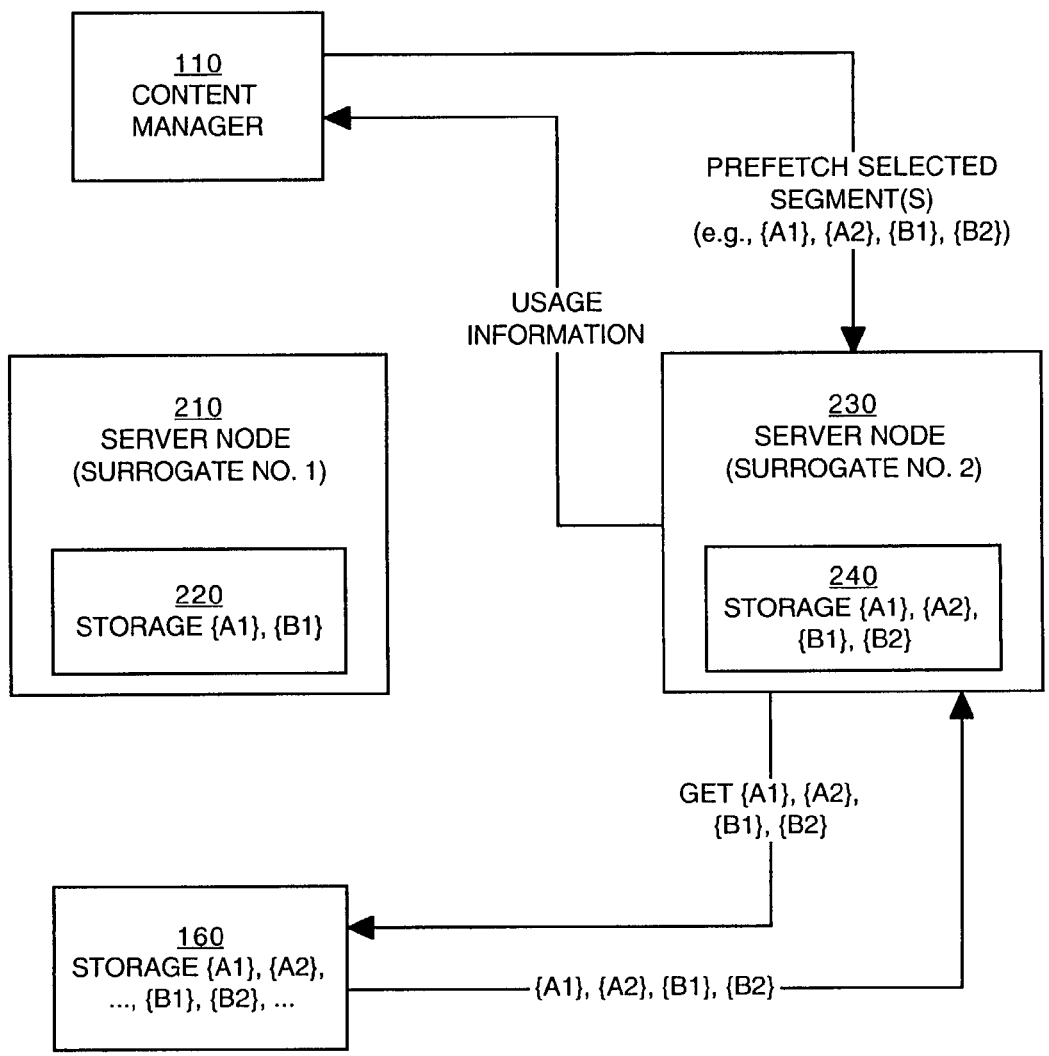

Considering the second of the segmentation factors mentioned above, the boundaries of the media segments are selected so as to be "friendly to the cache" (referring to the caches of the distributing server nodes; see FIGS. 3A and 3B). One aspect of this is that the length of each media segment may be designed to simplify filling of the cache. For instance, the media segments can be selected so that they have substantially the same size, or are integer multiples of a baseline size. In these instances, to make media segments the same size even when the content of the segments may be variable in length (e.g., in number of bits), the length of the valid media data can be identified, and bits occurring after the specified length would be ignored. Choosing the segment sizes to be approximately the same can facilitate replacement of one segment in a cache with another. Such a scheme can also allow cache space to be more efficiently utilized, with little fragmentation if any.

With regard to the third segmentation factor mentioned above, the boundaries of the media segment are selected recognizing that not all users will utilize an item of media content in its entirety, and that some items of media content will be more popular than others. For example, many people will often start watching a video at its beginning, but will stop watching after a relatively brief period of time. Accordingly, a media segment or segments may be defined to encompass the period at the beginning of a video that is frequently viewed. Portions of videos that may be frequently viewed may occur at points other than the beginning. For example, a live event that has been recorded may include portions of particularly high interest (e.g., a portion showing the home team scoring). A media segment or segments may be defined to encompass those periods as well.

Figure 2:
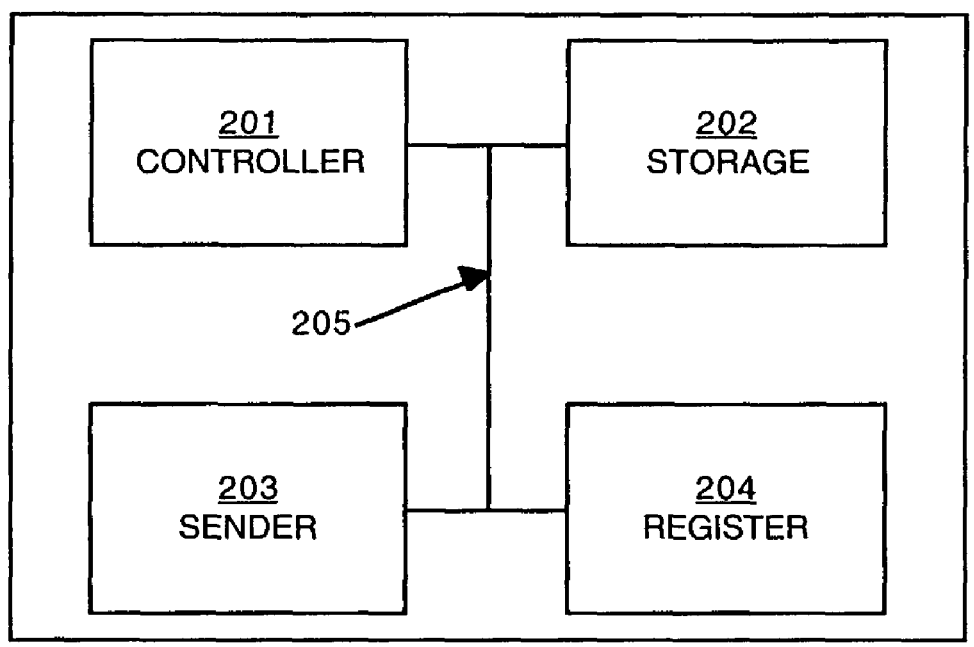
FIG. 2 is a block diagram of an exemplary server node upon which embodiments of the present invention may be practiced.

FIG. 2 is a block diagram of an exemplary server node 200 upon which embodiments of the present invention may be practiced. In this embodiment, server node 200 includes controller element 201, storage element 202, sender element 203, and register 204 (e.g., a memory element), each coupled to a bus 205. It is appreciated that server node 200 may include elements other than those shown and described, and that the functionality provided by different elements may be performed by a single element. For example, register 204 may be incorporated into storage element 202.

In the present embodiment, controller 201 is for processing information and instructions, in particular with regard to the retrieval of media segments that are to be stored in storage 202 and then forwarded to another node (e.g., a client or another server) by sender 203. Sender 203 typically functions by streaming media data to another node. Sender 203 may be either a wired or wireless transmitter. Register 204 is for storing information pertaining to the frequency of use of items of content and media segments, session durations as well as content start and stop times for content requests (e.g., start at content time 10 minutes, 30 seconds and end at content time 12 minutes, 15 seconds), the attributes of downstream (receiving) devices (client nodes or other server nodes), the attributes of the connection between server node 200 and downstream devices, and the attributes of downstream storage devices, for example. Other types of information that help to define which items of content are to be segmented, how they are to be segmented, and where the media segments are to be stored may also be collected in register 204.

FIGS. 3A and 3B illustrate a data flow for populating caches (e.g., storage 220 and storage 240) with media segments according to one embodiment of the present invention. In this embodiment, content manager 110 is communicatively coupled (via a wired or wireless connection) to server nodes 210 and 230. Server nodes 210 and 230 may also be referred to as surrogates (surrogate number 1 and number 2, respectively). In one embodiment, server nodes 210 and 230 can function as transcoders. Server nodes 210 and 230 may also include functionality allowing them to compress/decompress and/or encrypt/decrypt data.

Referring first to FIG. 3A, in the present embodiment, content manager 110 directs server node 210 to prefetch a selected media segment or segments (for example, media segments {A1} and {B1}). Server node 210 requests these segments from storage 160. The requested media segments are received from storage 160 and stored in storage (cache) 220. Note that content manager 110 may instead communicate directly with storage 160, directing that selected media segments be sent (downloaded) from storage 160 to a particular server node such as server node 210. Alternatively, in some cases as mentioned above, server node 210 (as well as other server nodes) may receive media segments directly from media segmenter 130 of FIG. 1.

Continuing with reference to FIG. 3A, in one embodiment, information ("usage information") describing the frequency of use of items of content and media segments, session duration as well as content start and stop times for content requests, the attributes of receiving devices (client nodes), and the attributes of storage devices can be accumulated and provided to content manager 110, as described above. This information may be automatically forwarded to content manager 110 either periodically or continually, or content manager 110 may request this information.

Referring next to FIG. 3B, in the present embodiment, content manager 110 directs server node 230 to prefetch one or more selected media segment(s) (e.g., {A1}, {A2}, {B1} and {B2}). Server node 230 requests these segments from storage 160. Note that, as mentioned above, there may be more than one storage element for storing media segments. In that case, server node 230 may request media segments from a storage element different than the storage element used by server node 210. In addition, a server may request a media segment from another server that hosts the media segment; for example, server node 230 could request media segments {A1} and {B1} from server node 210. Note also that, as in the above, content manager 110 may instead communicate directly with storage 160, or media segmenter 130 may communicate directly with server 230. In any case, the selected media segments are received by server node 230 and stored in storage (cache) 240. In the manner just described, different server nodes can be populated with the same or with different media segments.

Because each media segment is typically smaller in size and/or duration than an item of content in its entirety, more (different) items of content can be representatively stored in storage elements 220 and 240. That is, instead of storing a relatively small number of items of content in their entirety, a relatively large number of different items of contents are stored in part at each server node.

Figure 4:
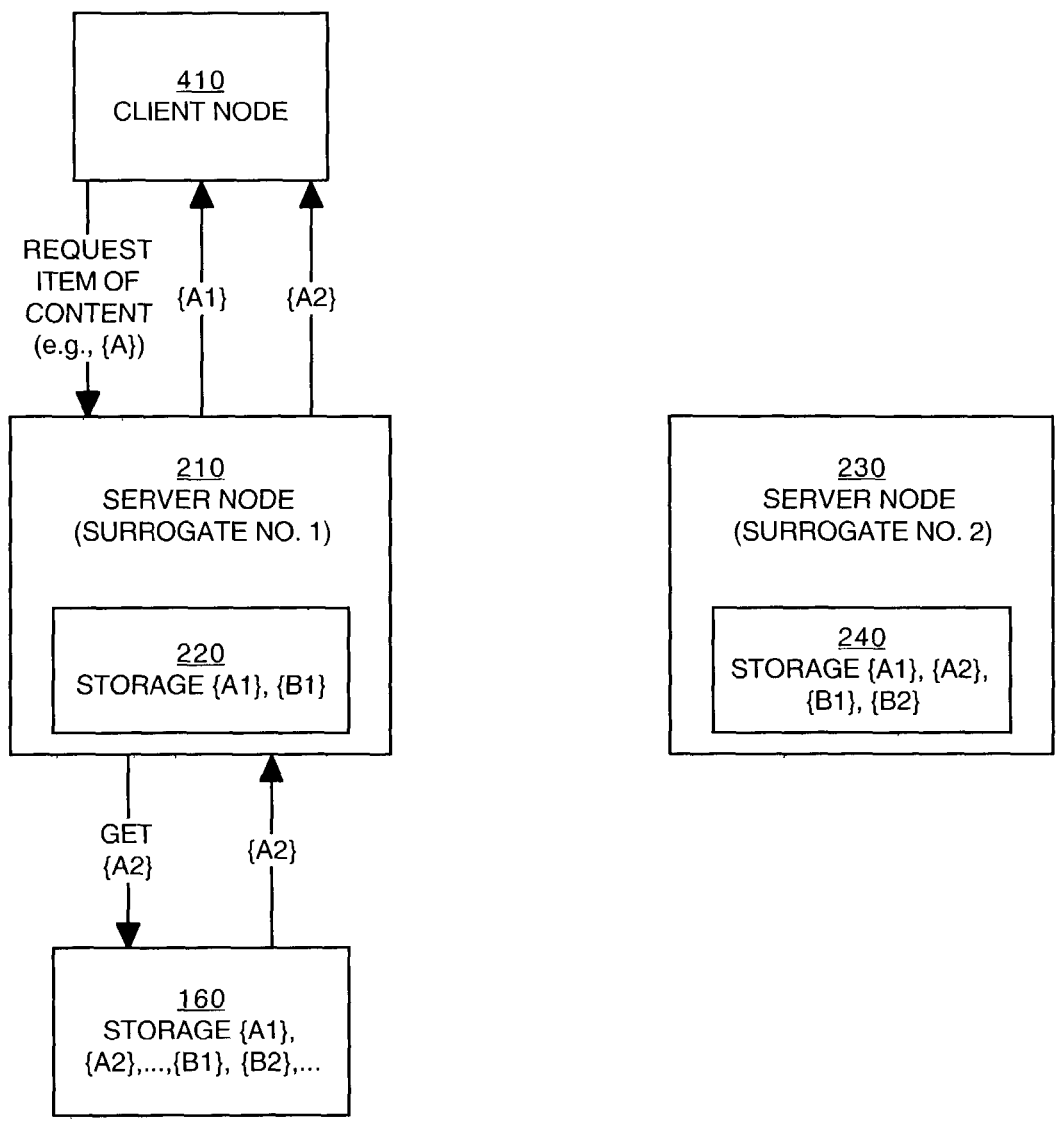
FIG. 4 illustrates a data flow for providing media segments to a client node according to one embodiment of the present invention.

FIG. 4 illustrates a data flow for providing media segments to a client node 410 according to one embodiment of the present invention. In this embodiment, client node 410 requests item of content A using a protocol such as but not limited to RTSP (real time streaming protocol). Server node 210 receives this request based on considerations such as but not limited to geographical proximity to client node 410. It is appreciated that server node 210 may provide service to a number of other client nodes in parallel with client node 410.

Server node 210, as described above, has media segment A1 cached in storage 220 but does not have item of content A, in its entirety, cached in storage 220. In the present embodiment, server node 210 forwards (e.g., streams) media segment A1 to client node 410 using a protocol such as but not limited to RTP (real-time transport protocol) or TCP (transmission control protocol). Substantially in parallel with the forwarding of media segment A1, server node 210 requests (prefetches) media segment A2 from storage 160. It is appreciated that media segment A2 can instead be prefetched from another server node (server node 230, for example). In any case, after the prefetch, media segment A2 is cached for subsequent forwarding to client node 410.

Note that media segment A2 may be the media segment immediately following media segment A1 in item of content A. That is, for example, media segment A1 may include the first minute of item of content A, and media segment A2 may include the portion of item of content A immediately following (contiguous with) media segment A1 (e.g., the second minute of content A). However, media segment A2 does not necessarily have to be the media segment immediately following media segment A1 in content A. For example, media segment A1 may be a portion of content A pertaining to a first scene or event of particular (perhaps popular) interest (e.g., the first score in a game), and media segment A2 may be a portion of content A pertaining to a second scene or event of particular (and perhaps popular) interest occurring after an interval of time has passed (e.g., the second score of the game). That is, there may be intervening media segments between media segment A1 and media segment A2.

Note also that the media segment following A1 does not necessarily have to be a media segment pertaining to item of content A. As explained above, for example, content A and content B may correspond to the same item of content but with different characteristics. For instance, content A may be encoded at a first bit rate and content B may be encoded at a second bit rate. In that case, a switch can be made from one bit rate to another at the segment boundaries. That is, media segment A1 can be forwarded by server node 210 to client node 410, followed by media segment B2. If media segment B2 is not hosted by server node 210, it can be prefetched as described above. Such a scheme may be useful for time-varying channels or when there is a portion of the content that a user would like to see with higher quality relative to another portion of the content.

Furthermore, note that a server node can start streaming a media segment before the entire media segment has been received (prefetched). In essence, it is only necessary that each byte or packet in the media segment be received before the time it is to be forwarded to a client node.

The prefetch of a media segment can be triggered by a variety of factors. For example, media segment A2 may be requested when the streaming of media segment A1 has continued for a certain period of time or to a certain point such as the half-way point, or when otherwise it is predicted that a client is likely to be interested in media segment A2. In general, a later media segment is requested and prefetched in a timely manner such that it is available to be forwarded to client node 410 when forwarding of the preceding media segment is completed.

From the perspective of client node 410, the prefetching of subsequent media segments is transparent; that is, client node 410 is not aware of whether or not content A is stored in entirety at server node 210. The media segments that constitute content A are made ready to be forwarded to client node 410 so that item of content A can be used at client node 410 without apparent disruption.

Thus, in a fashion similar to that just described, the media segment to be sent following media segment A2 is requested and prefetched at some point during the forwarding of one of the earlier media segments; that is, for example, a third media segment can be prefetched while either media segment A1 or A2 is being streamed. The media segments may be prefetched one-by-one, as described above, or they may be prefetched in quantity. For example, it may be possible to predict based on historical trends that a user interested in both media segments A1 and A2 will likely be interested in content A in its entirety. Consequently, some or all of the remaining media segments for content A can be prefetched in anticipation of the user's interest.

In the present embodiment, media segments are prefetched until the media session is either terminated or completed (e.g., the last segment of the item of content is forwarded to the requesting client). As used herein, a media session refers to the process(es) beginning when a client node initiates communication with a server node (e.g., the client requests an item of content) and ending when the client node terminates communication with the server node. Thus, a media session can include the forwarding of multiple instances of media segments for one or more items of media content.

Figure 5:
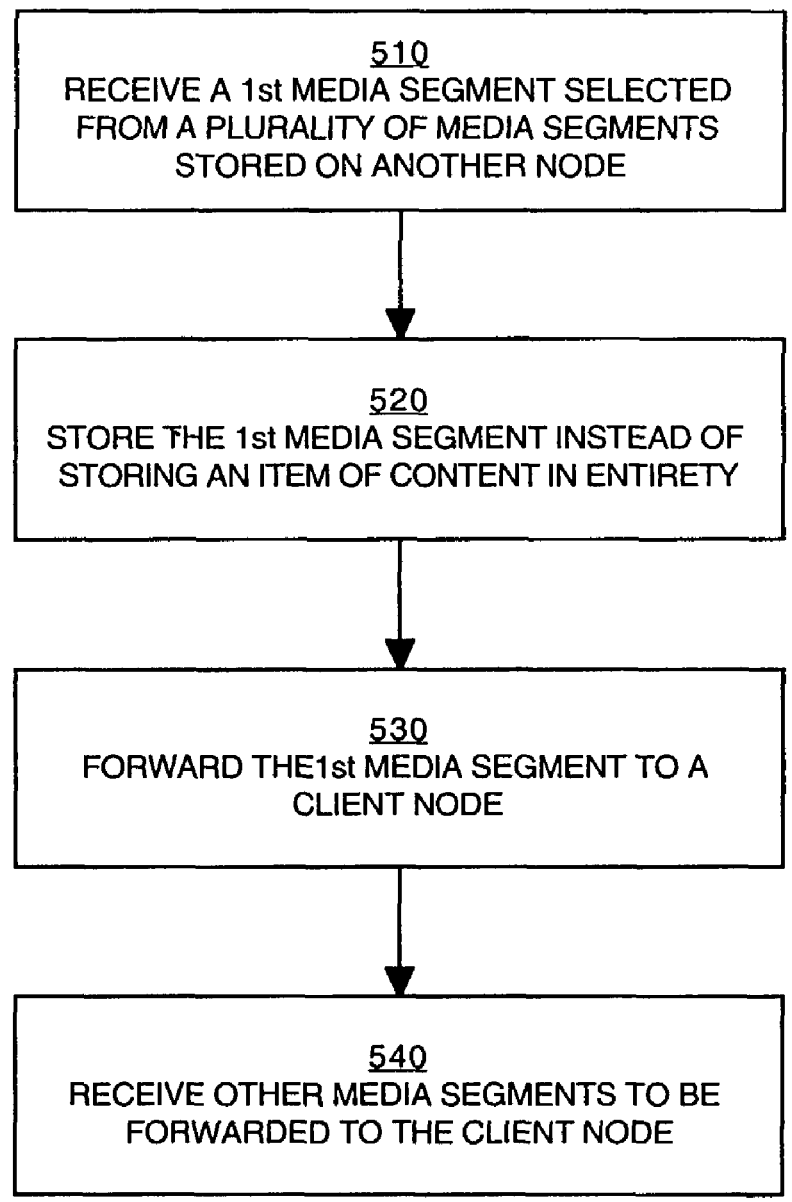
FIG. 5 is a flowchart of a method for distributing media data according to one embodiment of the present invention.

FIG. 5 is a flowchart 500 of a method for distributing media data according to one embodiment of the present invention. Although specific steps are disclosed in flowchart 500, such steps are exemplary. That is, embodiments of the present invention are well-suited to performing various other steps or variations of the steps recited in flowchart 500. It is appreciated that the steps in flowchart 500 may be performed in an order different than presented, and that not all of the steps in flowchart 500 may be performed. All of, or a portion of, the methods described by flowchart 500 may be implemented using computer-readable and computer-executable instructions which reside, for example, in computer-usable media of a computer system. Generally, flowchart 500 is implemented by server node 210 or server node 230 of FIGS. 3A and 3B.

In step 510, in the present embodiment, a first media segment, selected from a plurality of media segments stored on another node, is received. For example, with reference to FIGS. 3A and 3B, server node 210 receives media segment A1 selected from the plurality of media segments stored at storage element 160. However, server node 210 could instead receive media segment A1 from server node 230. Also, in some instances, media segment A1 may be provided to server node 210 directly from media segmenter 130 (FIG. 1).

In step 520 of FIG. 5, in the present embodiment, the first media segment is stored (cached) instead of storing a corresponding item of media content in its entirety. For example, again with reference to FIGS. 3A and 3B, server node 210 stores media segment A1 in lieu of storing item of media content A in its entirety.

In step 530 of FIG. 5, in the present embodiment, the first media segment is forwarded (e.g., streamed) to a requesting node. For example, with reference to FIG. 4, media segment A1 is forwarded to client node 410.

In step 540 of FIG. 5, in the present embodiment, other media segments that are to be forwarded to the requesting node are received (e.g., requested and prefetched). For example, again with reference to FIG. 4, server node 210 requests and prefetches media segment A2 from storage element 160, and forwards media segment A2 to client node 410. Note that media segment A2 could have been requested and prefetched from server node 230 instead of from storage 160, or directly from media segmenter 130 (FIG. 1).

Session Handoff of Segmented Media Data

Figure 6A:
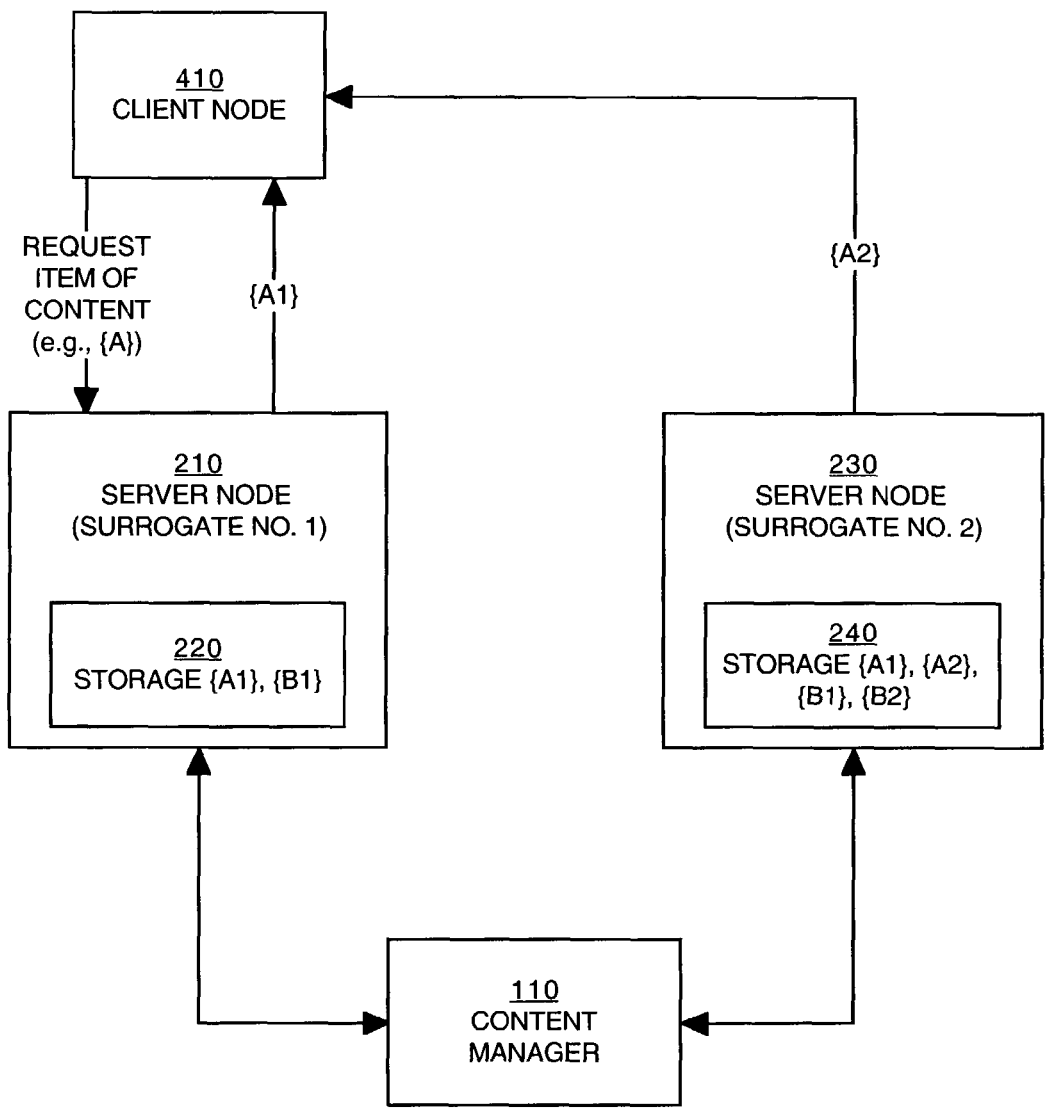
FIG. 6A illustrates a data flow for handing off a media session according to one embodiment of the present invention.

FIG. 6A illustrates a data flow for handing off a media session according to one embodiment of the present invention. In this embodiment, client node 410 is not necessarily a mobile device. That is, in the present embodiment, the handoff of client node 410 between server node 210 and server node 230 is predicated on the location of the media segment of immediate interest. This is further explained by the example below. Other factors may influence the handoff of a client node from one server node to another, even when the client node is not moving. For instance, a client may be handed off to balance the load among server nodes.

In the present embodiment, client node 410 requests item of content A. Server node 210 responds by forwarding (streaming) media segment A1, as described above. However, instead of prefetching media segment A2 from storage element 160 (FIG. 4) or server node 230, the media session initiated by client node 410 is handed off to server node 230. Server node 230 can then forward (stream) media segment A2 to client node 410. Significantly, according to the present embodiment, the handoff of the media session is timed to occur between the streaming of media segments A1 and A2. Server node 230 can be primed with handoff information in advance, so that the handoff occurs transparently to client node 410. That is, client node 410 will receive media segments A1 and A2 without apparent disruption.

In one embodiment, the handoff is accomplished under the control and direction of a centralized node such as content manager 110. It is understood that another entity (e.g., a dedicated handoff manager) can perform this function instead. In one embodiment, server node 210 specifies handoff information used to transfer the media session to another server node. In one such embodiment, the handoff information is forwarded to content manager 110. Content manager 110 can then select a server node (e.g., server node 230) that will receive the media session handoff, and forward the handoff information to that server node. In another embodiment, content manager 110 can identify the server node that will receive the media session handoff, and direct server node 210 to communicate the handoff information directly to that server node.

In various embodiments, the handoff information includes some combination of the following information: information identifying the first media segment (e.g., A1), information identifying the next media segment to be forwarded (e.g., A2), information identifying a time the forwarding of the first media segment will be completed, information identifying a start time for forwarding of the next media segment, and information identifying client node 410.

Media segmentation offers a number of advantages when applied to media session handoffs. Importantly, media segmentation provides a convenient point for performing the handoff; that is, the handoff can occur between media segments. This can lead to a dramatic simplification in the processing performed to accomplish a handoff. Also, because the handoff information used according to the embodiments of the present invention is relatively small, the amount of handoff information will be reduced in some instances, allowing more efficient utilization of available bandwidth. In addition, as mentioned above, the timing of handoffs can be simplified because a server node can start streaming a media segment before the entire media segment has been received (prefetched). Thus, a server node can accept a handoff and begin streaming media data to a client node before an entire media segment has been prefetched.

Figure 6B:
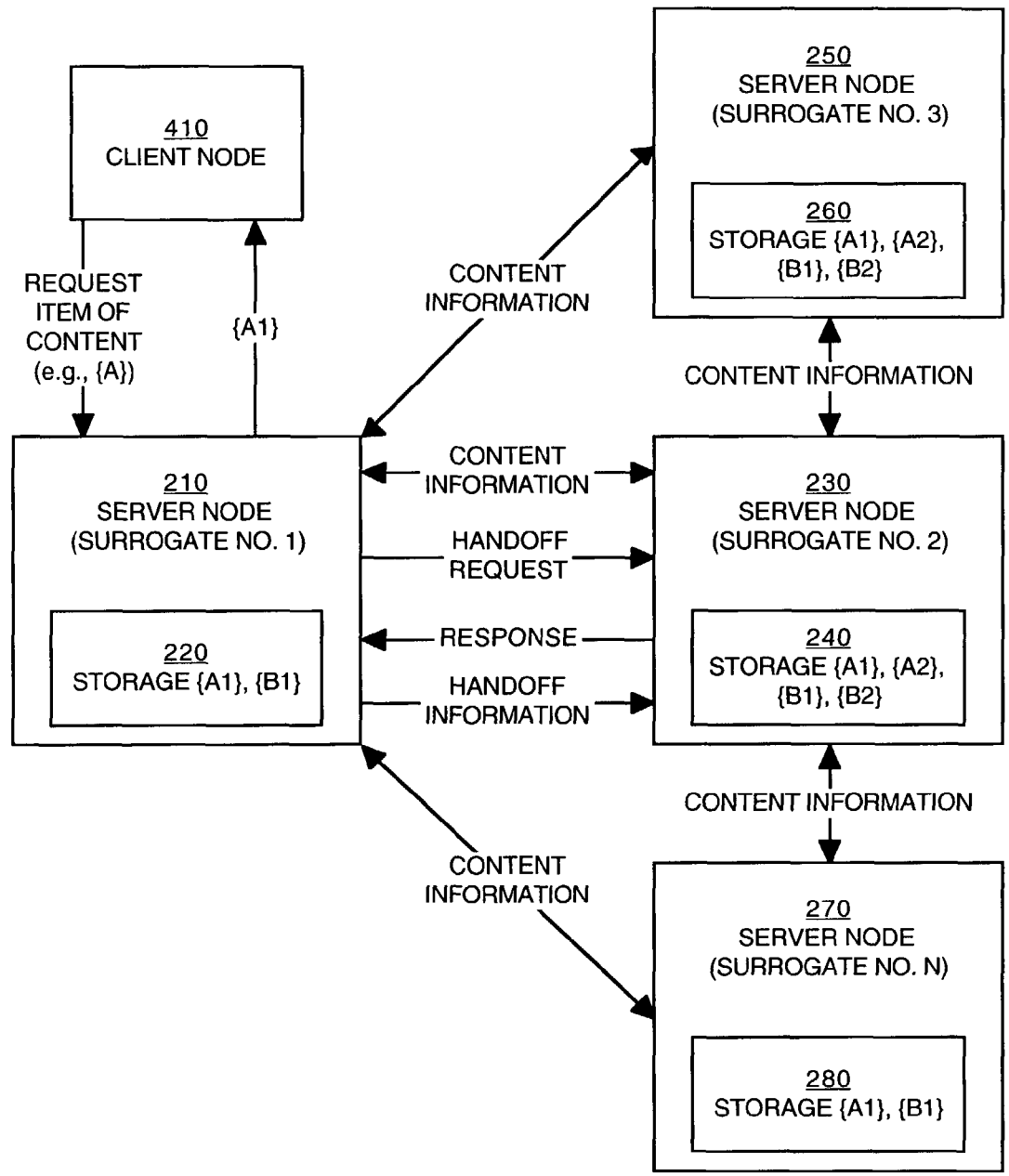
FIG. 6B illustrates a data flow for handing off a media session according to another embodiment of the present invention.

FIG. 6B illustrates an embodiment in which a handoff is accomplished using a distributed approach that involves interaction between the server nodes themselves, without the intervention of a centralized node such as content manager 110 of FIG. 6A. This distributed approach provides a number of benefits including improved scalability and robustness to failure of the centralized node. In a distributed approach, the server nodes (surrogates 1, 2, 3, . . . , N) can communicate to each other the content information (e.g., media segments) they have in their respective caches. With this information, as well as other information such as the locations of the other servers, a server (e.g., server node 210) conducting a media session can identify other servers (e.g., server nodes 230 and 250) that have a media segment of interest (e.g., media segment A2). These server nodes, based on factors such as their current loads including available storage capacity, network loads and the like, can determine whether or not they can support the handoff, and communicate appropriately to server node 210. In the example of FIG. 6B, server node 210 sends a handoff request to server node 230, and receives a response to the request. The handoff information described above is then provided by server node 210 to server 230.

Figure 7:
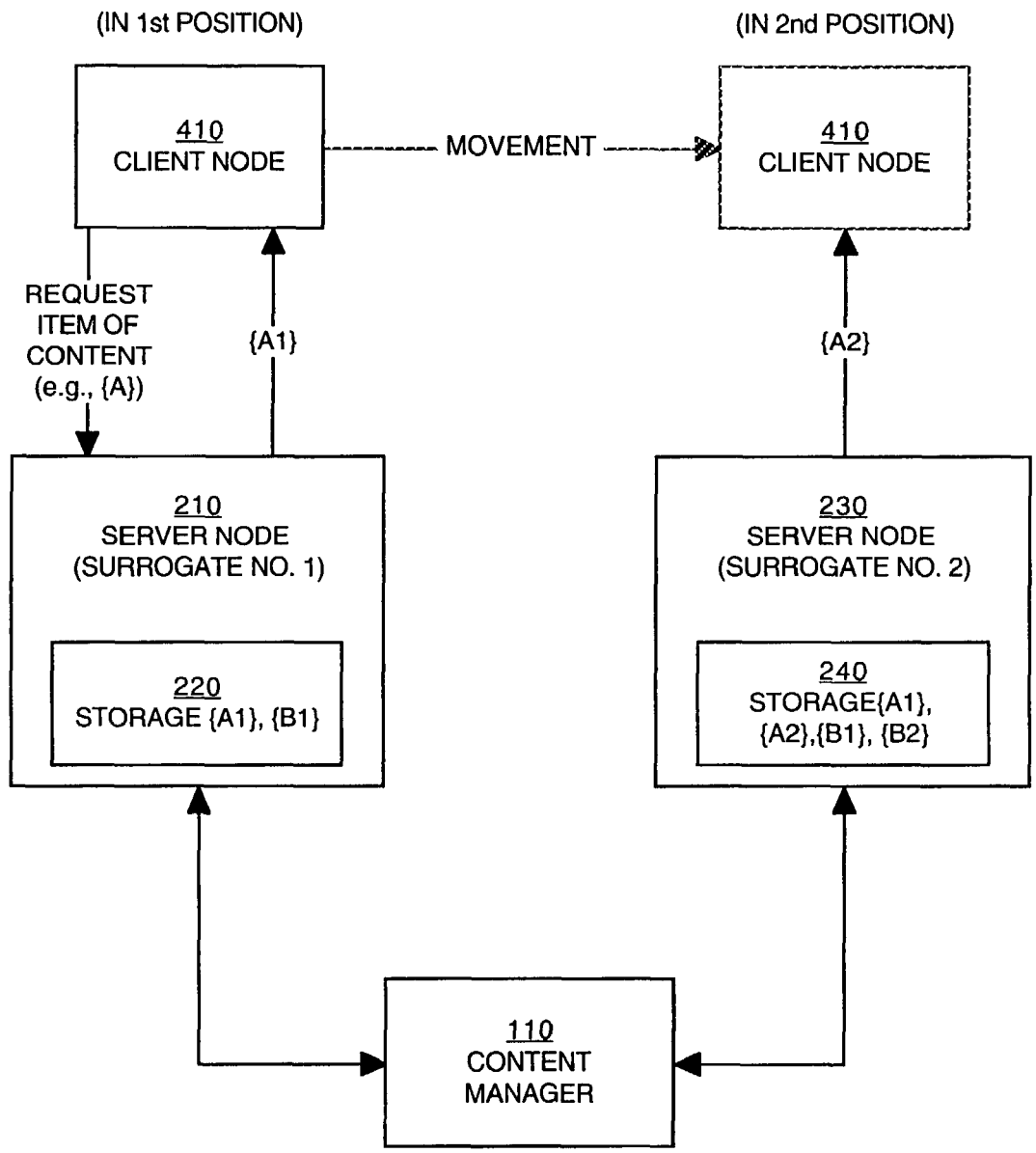
FIG. 7 illustrates a data flow for handing off a media session according to yet another embodiment of the present invention.

FIG. 7 illustrates a data flow for handing off a media session according to another embodiment of the present invention. In this embodiment, client node 410 is mobile. That is, in the present embodiment, the handoff of client-node 410 between server node 210 and server node 230 is predicated on the location of client node 410.

In the present embodiment, client node 410 requests item of content A. Server node 210 responds by forwarding (streaming) media segment A1, as described above. Client node 410 moves from a first position to a second position while still receiving media segment A1 from server node 210. The media session initiated by client node 410 is then handed off to server node 230. Server node 230 can then forward (stream) media segment A2 to client node 410. As in the example above, the handoff of the media session is timed to occur between the streaming of media segments A1 and A2. Server node 230 can be primed with handoff information in advance, so that the handoff occurs transparently to client node 410.

In the present embodiment, the handoff is accomplished under the control and direction of a centralized node such as content manager 110, although another entity (e.g., a dedicated handoff manager) can perform this function instead. The type of handoff information used for transferring the media session from server node 210 to server node 230 is analogous to that described above. The management of the handoff information by content manager 110 and/or by the participating server nodes is also analogous to that described above.

Note that, as an alternative to the embodiments of FIGS. 6A, 6B and 7, a server node may be selected to receive a handoff (or agree to receive the handoff) even when that server node does not have a media segment of interest. For example, a server node may be selected to receive the handoff based on its location or the location of the client, without regard to whether the media segment of interest is hosted by that server node. In response to being selected (or to agreeing to receive the handoff), the server node can then prefetch the media segment of interest, in particular with sufficient time so that the media segment can be prefetched before it is due to be forwarded to the client.

Figure 8A:
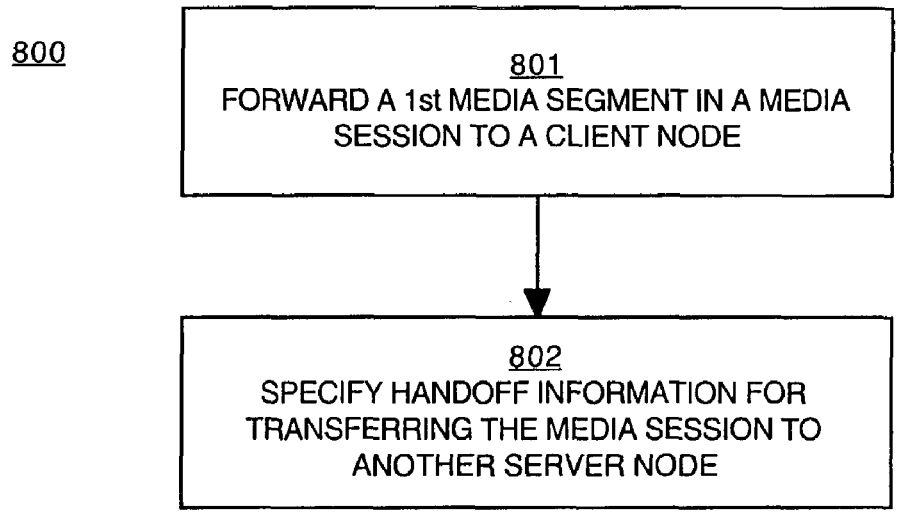
FIG. 8A is a flowchart of a method for handing off a media session according to one embodiment of the present invention.
Figure 8B:
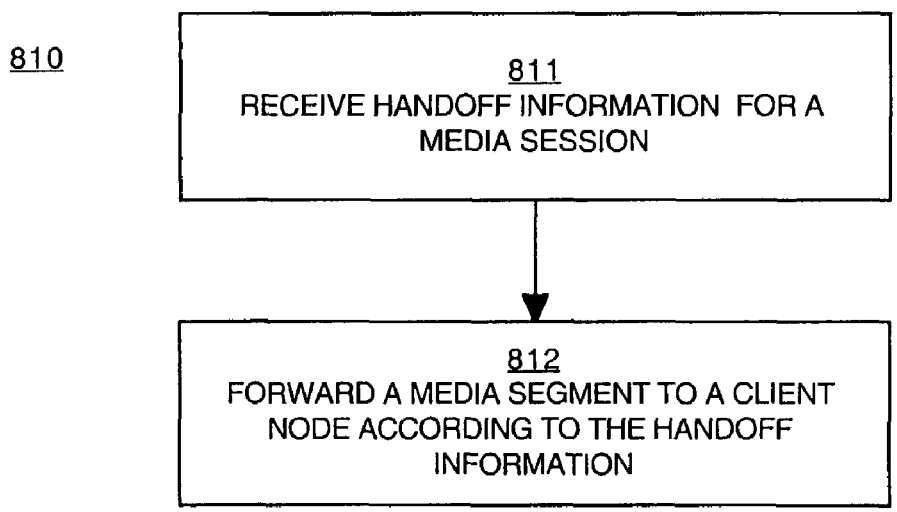
FIG. 8B is a flowchart of a method for continuing a media session handed off by another server node according to one embodiment of the present invention.
Figure 8C:
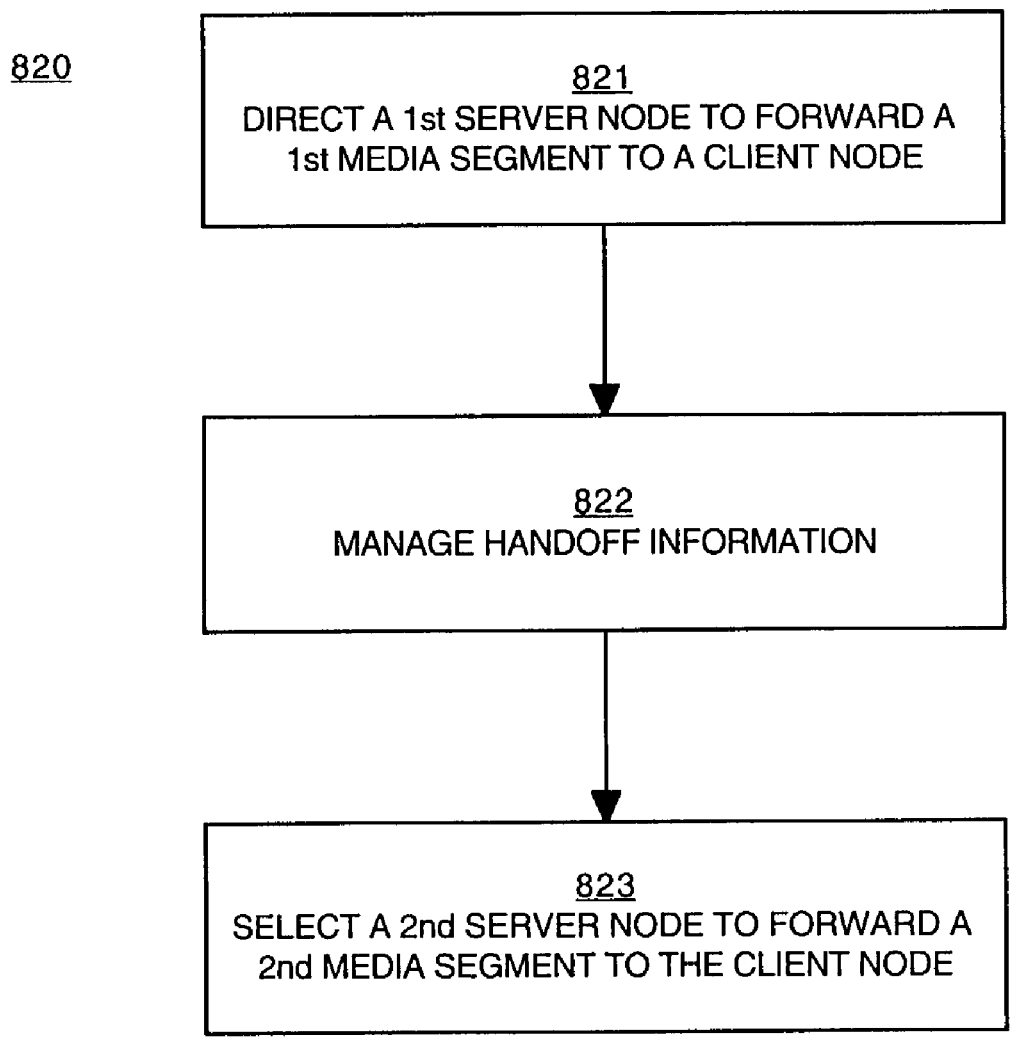
FIG. 8C is a flowchart of a method for managing media session handoffs according to one embodiment of the present invention.

FIG. 8A is a flowchart 800 of a method for handing off a media session according to one embodiment of the present invention. FIG. 8B is a flowchart 810 of a method for continuing a media session handed off by another server node according to one embodiment of the present invention. FIG. 8C is a flowchart 820 of a method for managing media session handoffs according to one embodiment of the present invention. All of, or a portion of, the methods described by flowcharts 800, 810 and 820 may be implemented using computer-readable and computer-executable instructions which reside, for example, in computer-usable media of a computer system. Generally, with reference to FIGS. 6 and 7, flowchart 800 is implemented by server node 210, flowchart 810 is implemented by server node 230, and flowchart 820 is implemented by content manager 110. Although specific steps are disclosed in flowcharts 800, 810 and 820, such steps are exemplary. That is, embodiments of the present invention are well-suited to performing various other steps or variations of the steps recited in flowcharts 800, 810 and 820. It is appreciated that the steps in flowcharts 800, 810 and 820 may be performed in an order different than presented, and that not all of the steps in flowcharts 800, 810 and 820 may be performed.

With reference to FIG. 8A, in step 801, according to the present embodiment a first media segment is forwarded to a client node in a media session. For example, with reference to FIGS. 6A, 6B and 7, media segment A1 is forwarded (streamed) from server node 210 to client node 410.

In step 802 of FIG. 8A, in the present embodiment, handoff information is specified such that the handoff between server nodes will occur between media segments. For example, again with reference to FIGS. 6A, 6B and 7, server node 210 specifies handoff information that can be used to transfer the media session to another server node such as server node 230. The handoff information may be provided to a centralized node or to another server node (e.g., the node that will receive the handoff).

Referring now to FIG. 8B, in step 811, according to the present embodiment handoff information for a media session is received from another node. Referring to FIGS. 6A, 6B and 7, in various embodiments, the handoff information may be received from a centralized node such as content manager 110, or from the server node (e.g., server node 210) that is currently conducting the media session with client node 410.

In step 812 of FIG. 8B, in the present embodiment, the handoff is completed and a media segment is forwarded (streamed) to a client node. The media segment to be forwarded is identifiable from the handoff information, as described above. With reference to FIGS. 6A, 6B and 7, in one embodiment, according to the handoff information, media segment A2 is identifiable as the next media segment to be sent to client node 410. The handoff from server node 210 to server node 230 occurs between the streaming of media segment A1 and the streaming of media segment A2.

With reference next to FIG. 8C, in step 821, according to the present embodiment a first server node is directed to send a first media segment to a client node as part of a media session. For example, with reference to FIGS. 6A and 7, server node 210 is directed by content manager 110 to send media segment A1 to client node 410.

In step 822 of FIG. 8C, in the present embodiment, handoff information used for transferring the media session from the first server node to another server node is managed. That is, in one embodiment and with reference to FIGS. 6A and 7, handoff information from server node 210 is received and forwarded to the server node selected to receive the handoff (e.g., server node 230). In another embodiment, server node 210 is directed to provide the handoff information to the selected server node.

In step 823 of FIG. 8C, in the present embodiment, a server node is selected to receive the media session handoff. In one embodiment, a server node is selected to receive the handoff according to the location of the next media segment to be sent as part of the ongoing media session. For example, with reference to FIG. 6A, server node 230 is selected because it has cached media segment A2, which is to be sent to client node 410 after media segment A1 is sent. In another embodiment, a server node is selected to receive the handoff according to the location of the client node, particularly for the case in which the client node is moving. For example, with reference to FIG. 7, server node 230 is selected not only because it has cached media segment A2, but because it can provide service to mobile client node 410. However, as mentioned above, a server node may be selected even when the server node does not yet have the media segment of interest. A server node may be selected based on network loads, individual server loads, and the like. In any of these embodiments, the handoff from server node 210 to server node 230 occurs between the streaming of media segment A1 and the streaming of media segment A2.

In summary, in its various embodiments, the present invention provides a method and system thereof for delivering large items of media content, doing so in a manner that provides a number of advantages. These advantages include efficient use of available memory resources, so that content can be brought closer to requesting client nodes. As such, the present invention in its various embodiments also reduces response times, increases bandwidths to clients, reduces loss rates, improves scalability, and reduces requirements for network (backbone) resources. Moreover, these advantages are achieved in a manner that is transparent to clients. Furthermore, handoff of media sessions between server nodes is facilitated, with a potential reduction in the amount of handoff information used for accomplishing media session handoffs.

Embodiments of the present invention are thus described. While the present invention has been described in particular embodiments, it should be appreciated that the present invention should not be construed as limited by such embodiments, but rather construed according to the following claims.

What is claimed is:

1. A method of handing off a media session, said method comprising:
    forwarding a first media segment from a first server node to a client node, said first media segment comprising a first portion of an encoded item of media content stored at said first server node in lieu of storing said item of media content in its entirety at said first server node; and
    said first server node specifying handoff information used for transferring said media session to a second server node, wherein as part of said media session said second server forwards a second media segment comprising a second portion of said item of media content, wherein said second server does not comprise said first portion of said media segment and said first server does not comprise said second portion of said media segment, and wherein handoff of said media session to said second server node occurs between said first and second media segments.

2. The method of claim 1 wherein said handoff information comprises information selected from the group consisting of: information identifying said first media segment, information identifying a next media segment to be forwarded, information identifying a time said forwarding of said first media segment will be completed, information identifying a start time for forwarding of said next media segment, and information identifying said client node.

3. The method of claim 1 further comprising:
    providing said handoff information to said second server node.

4. The method of claim 1 further comprising:
    providing said handoff information to a centralized node adapted to manage media session handoffs.

5. The method of claim 1 further comprising:
    collecting information pertaining to use of said first media segment by client nodes.

6. The method of claim 5 further comprising:
    providing said information to a centralized node adapted to use said information to identify media segments to be stored by said first server node.

7. The method of claim 1 wherein said item of media content is segmented according to data characteristics of said item of media content, storage characteristics of said first server node, and a predicted frequency of use of each portion of said item of media content.

8. A method of continuing a media session handed off by a first server node, said method comprising:
    receiving, at a second server node, handoff information for said media session from said first server node, wherein said media session comprises said first server node sending a first media segment to a client node, said first media segment comprising a first portion of an item of media content; and
    forwarding a second media segment to said client node according to said handoff information, said second media segment comprising a second portion of said encoded item of media content that is stored at said second server node in lieu of storing said item of media content in its entirety at said second server node, wherein said second server does not comprise said first portion of said media segment and said first server does not comprise said second portion of said media segment of media content, and wherein handoff between said first and second server nodes occurs between said first and second media segments.

9. The method of claim 8 wherein said handoff information comprises information selected from the group consisting of: information identifying said media segment, information identifying a start time for forwarding of said media segment, and information identifying said client node.

10. The method of claim 8 further comprising:
    receiving said handoff information from said first server node.

11. The method of claim 8 further comprising:
receiving said handoff information from a centralized node adapted to manage media session handoffs.

12. The method of claim 8 further comprising:
collecting information pertaining to use of said second media segment by client node.

13. The method of claim 12 further comprising:
providing said information to a centralized node adapted to use said information to identify media segments to be stored by said first server node.

14. A method of managing media session handoffs, said method comprising:
directing a first server node to forward a first media segment to a client node, said first media segment selected from a plurality of media segments and comprising a first portion of an encoded item of media content stored at said first server node in lieu of storing said item of media content in its entirety at said first server node; and
selecting a second server node to forward a second media segment to said client node, said second media segment comprising a second portion of said item of media content stored at said second server node in lieu of storing said item of media content in its entirety, wherein said second server does not comprise said first portion of said media segment and said first server does not comprise said second portion of said media segment, and wherein said second media segment is forwarded upon completion of said forwarding of said first media segment, and wherein further handoff between said first and second server nodes occurs between said first and second media segments, said handoff performed according to handoff information received from said first server node and sent to said second server node.

15. The method of claim 14 wherein said handoff information comprises information selected from the group consisting of:
information identifying said first media segment, information identifying said second media segment, information identifying a time said forwarding of said first media segment will be completed, information identifying a start time for forwarding of said second media segment, and information identifying said client node.

16. The method of claim 15 further comprising:
receiving said handoff information from said first server node; and
providing handoff information to said second server node.

17. The method of claim 15 further comprising:
directing said first server node to send said handoff information to said second server node.

18. The method of claim 14 further comprising:
selecting said second server node according to a location of said client node.

19. The method of claim 14 further comprising:
selecting said second server node according to a storage location of said second media segment.

20. The method of claim 14 wherein said second server node is selected according to a criterion selected from the group consisting of:
network loads, server node load, server node storage capacity, and server node proximity to said client node.

* * * * *